United States Patent
Wetterwald et al.

(10) Patent No.: US 9,992,703 B2
(45) Date of Patent: Jun. 5, 2018

(54) INSERTION OF MANAGEMENT PACKET INTO A DETERMINISTIC TRACK

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Michel Levy-Abegnoli, Valbonne (FR); Jean-Philippe Vasseur, Anchorage, AK (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 115 days.

(21) Appl. No.: 15/089,711

(22) Filed: Apr. 4, 2016

(65) Prior Publication Data
US 2017/0289846 A1    Oct. 5, 2017

(51) Int. Cl.
*H04W 28/06* (2009.01)
*H04L 29/08* (2006.01)
*H04L 29/12* (2006.01)
*H04B 1/713* (2011.01)
*H04W 52/02* (2009.01)
(Continued)

(52) U.S. Cl.
CPC .......... *H04W 28/065* (2013.01); *H04B 1/713* (2013.01); *H04L 29/08018* (2013.01); *H04L 61/6059* (2013.01); *H04W 52/0203* (2013.01); *H04L 25/0218* (2013.01); *H04L 41/00* (2013.01)

(58) Field of Classification Search
CPC ............ H04W 28/065; H04W 52/0203; H04B 1/713; H04B 7/18519; H04B 7/18569; H04B 7/18573; H04B 7/18597; H04L 29/08018; H04L 61/6059; H04L 29/08819;
(Continued)

(56) References Cited

U.S. PATENT DOCUMENTS 5,274,641 A * 12/1993 Shobatake .......... H04L 12/5602
                                                    370/392
7,366,111 B2   4/2008 Thubert et al.
(Continued)

OTHER PUBLICATIONS

Convida Wireless, Chen, Zhu, WO2016/089944 A1 (= PCT/US2015/063332), filed Dec. 2, 2015, published Jun. 9, 2016, all pages.*

(Continued)

*Primary Examiner* — Warner Wong
(74) *Attorney, Agent, or Firm* — Leon R. Turkevich

(57) ABSTRACT

In one embodiment, a method comprises: a first network device in a deterministic network identifying first and second slots for transmission of a data packet toward a destination device along a deterministic track of the deterministic network, the first slot reserved for the first network device receiving the data packet from a second network device and the second slot reserved for transmission by the first network device of the data packet toward the destination device along the deterministic track; the first network device detecting, in the first slot, an absence of receiving the data packet from the second network device; and the first network device selectively generating and transmitting in the second slot, in response to the absence of receiving the data packet, a management packet along the deterministic track.

20 Claims, 5 Drawing Sheets

(51) Int. Cl.
*H04L 25/02* (2006.01)
*H04L 12/24* (2006.01)

(58) Field of Classification Search
CPC ......... H04L 67/2852; H04L 2012/5625; H04L 41/00; H04L 25/0218
See application file for complete search history.

(56) References Cited

U.S. PATENT DOCUMENTS

| | | | |
|---|---|---|---|
| 7,593,377 B2 | 9/2009 | Thubert et al. | |
| 7,885,274 B2 | 2/2011 | Thubert | |
| 7,886,075 B2 | 2/2011 | Molteni et al. | |
| 2006/0146887 A1* | 7/2006 | Muguruma | H04W 56/00 370/503 |
| 2010/0074273 A1* | 3/2010 | Ji | H04L 45/10 370/465 |
| 2011/0299455 A1* | 12/2011 | Ordentlich | H04L 69/04 370/328 |
| 2012/0051253 A1* | 3/2012 | Ji | H04L 45/10 370/252 |
| 2013/0083722 A1* | 4/2013 | Bhargava | H04W 48/20 370/315 |
| 2013/0295921 A1* | 11/2013 | Bhargava | H04W 48/20 455/426.1 |
| 2014/0153505 A1* | 6/2014 | Pantelidou | H04W 28/065 370/329 |
| 2015/0023326 A1* | 1/2015 | Thubert | H04W 72/0446 370/336 |
| 2015/0051253 A1* | 2/2015 | Ambrus | C07C 55/02 514/343 |
| 2015/0078333 A1 | 3/2015 | Byers et al. | |
| 2016/0269096 A1 | 9/2016 | Thubert et al. | |
| 2017/0118270 A1* | 4/2017 | Kulkarni | H04L 67/06 |
| 2017/0324472 A1* | 11/2017 | Kitamura | H04B 10/032 |

OTHER PUBLICATIONS

Wang et al., "6TiSCH Operation Sublayer (6top) Interface", [online], Jul. 6, 2015, [retrieved on Jan. 27, 2016]. Retrieved from the Internet: <URL: https://tools.ietf.org/pdf/draft-ietf-6tisch-6top-interface-04.pdf>, pp. 1-34.

Thubert, Ed., "An Architecture for IPv6 over the TSCH mode of IEEE 802.15.4", [online], Nov. 26, 2015, [retrieved on Jan. 27, 2016]. Retrieved from the Internet: <URL: https://tools.ietf.org/pdf/draft-ieff-6tisch-architecture-09.pdf>, pp. 1-47.

Sudhaakar et al., "6TiSCH Resource Management and Interaction using CoAP", [online], Mar. 9, 2015, [retrieved on Jan. 27, 2016]. Retrieved from the Internet: <URL: https://tools.ietf.org/pdf/draft-ieff-6tisch-coap-03.pdf>, pp. 1-16.

Vilajosana et al., "Minimal 6TiSCH Configuration", [online], Jan. 16, 2016, [retrieved on Jan. 27, 2016]. Retrieved from the Internet: <URL: https://tools.ietf.org/pdf/draft-ietf-6tisch-minimal-14.pdf>, pp. 1-28.

Palattella, et al., "Terminology in IPv6 over the TSCH mode of ISSS 802.15.4e", [online], Nov. 2, 2015, [retrieved on Jan. 27, 2016]. Retrieved from the Internet: <URL: https://tools.ietf.org/pdf/draft-ieff-6tisch-terminology-06.pdf>, pp. 1-14.

Winter, et al., "RPL: IPv6 Routing Protocol for Low-Power and Lossy Network", Internet Engineering Task (IETF), Request for Comments: 6550, Mar. 2012, pp. 1-157.

Watteyne, et al., "Using IEEE 802.15.4e Time-Slotted Channel Hopping (RSCH) in the Internet of Things (IoT): Problem Statement", Internet Engineering Task Force (IETF), Request for Comments: 7554, May 2015, pp. 1-23.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

TTTECH, "Time-Triggered Ethernet—A Powerful Network Solution for Multiple Purpose", [online], [retrieved on Feb. 11, 2016]. Retrieved from the Internet: <URL: https://www.tttech.com/download/technologies/deterministic-ethernet/time-triggered-ethernet/?file=%2Ffileadmin%2Fcontent%2Fgeneral%2Fsecure%2FTT-Ethernet%2FTTTech_TTEthernet_Technical-Whitepaper.pdf&hash=0560afac568e8db0ee899519f1f95b4b&eID=fileDownload>, pp. 1-14.

Wikipedia, "Generalized Multi-Protocol Label Switching", [online], Aug. 18, 2014, [retrieved on Feb. 4, 2016]. Retrieved from the Internet: <URL: https://en.wikipedia.org/w/index.php?title=Generalized_Multi-Protocol_Label_Switching&printable=yes>, pp. 1-2.

Thubert et al., U.S. Appl. No. 14/642,066, filed Mar. 9, 2015.
Levy-Abegnoli et al., U.S. Appl. No. 14/816,108, filed Aug. 3, 2015.
Thubert et al., U.S. Appl. No. 15/009,872, filed Jan. 29, 2016.
Wetterwald et al., U.S. Appl. No. 15/089,731, filed Apr. 4, 2016.
Thubert et al., U.S. Appl. No. 15/055,690, filed Feb. 29, 2016.
Braden et al., "Resource ReSerVation Protocol (RSVP)—Version 1 Functional Specification", Network Working Group, Request for Comments: 2205, Sep. 1997, pp. 1-112.
Farrel et al., "Inter-Domain MPLS and GMPLS Traffic Engineering—Resource Reservation Protocol-Traffic (RSVP-TE) Extensions", Network Working Group, Request for Comments: 5151, Feb. 2008, pp. 1-25.

* cited by examiner

INSERTION OF MANAGEMENT PACKET INTO A DETERMINISTIC TRACK

TECHNICAL FIELD

The present disclosure generally relates to insertion of a management packet into a deterministic track of a deterministic network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability.

The 6TiSCH architecture specifies a Channel distribution/usage (CDU) matrix of "cells", each cell representing a unique wireless channel at a unique timeslot. The 6TiSCH architecture also specifies installation of a track allocating a sequence of cells for each hop along a path from a source to a destination, for deterministic forwarding of a data packet. Loss of the data packet along the track, however, results in unused cells "downstream" of the network device that lost the data packet.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: a first network device in a deterministic network identifying first and second slots for transmission of a data packet toward a destination device along a deterministic track of the deterministic network, the first slot reserved for the first network device receiving the data packet from a second network device and the second slot reserved for transmission by the first network device of the data packet toward the destination device along the deterministic track; the first network device detecting, in the first slot, an absence of receiving the data packet from the second network device; and the first network device selectively generating and transmitting in the second slot, in response to the absence of receiving the data packet, a management packet along the deterministic track.

In another embodiment, an apparatus comprises a device interface circuit, and a processor circuit. The processor circuit is configured for identifying first and second slots for transmission of a data packet toward a destination device along a deterministic track of a deterministic network, the first slot reserved for the apparatus, operating as a first network device, receiving the data packet from a second network device and the second slot reserved for transmission by the apparatus of the data packet toward the destination device along the deterministic track. The processor circuit further is configured for detecting, in the first slot, an absence of receiving the data packet from the second network device, and in response to the detected absence selectively generating a management packet and causing transmission, by the device interface circuit, of the management packet along the deterministic track in the second slot.

In another embodiment, one or more non-transitory tangible media are encoded with logic for execution by a machine and when executed by the machine operable for: the machine, operating as a first network device, identifying first and second slots for transmission of a data packet toward a destination device along a deterministic track of a deterministic network, the first slot reserved for the first network device receiving the data packet from a second network device and the second slot reserved for transmission by the first network device of the data packet toward the destination device along the deterministic track; the first network device detecting, in the first slot, an absence of receiving the data packet from the second network device; and the first network device selectively generating and transmitting in the second slot, in response to the absence of receiving the data packet, a management packet along the deterministic track.

DETAILED DESCRIPTION

Figure 1:
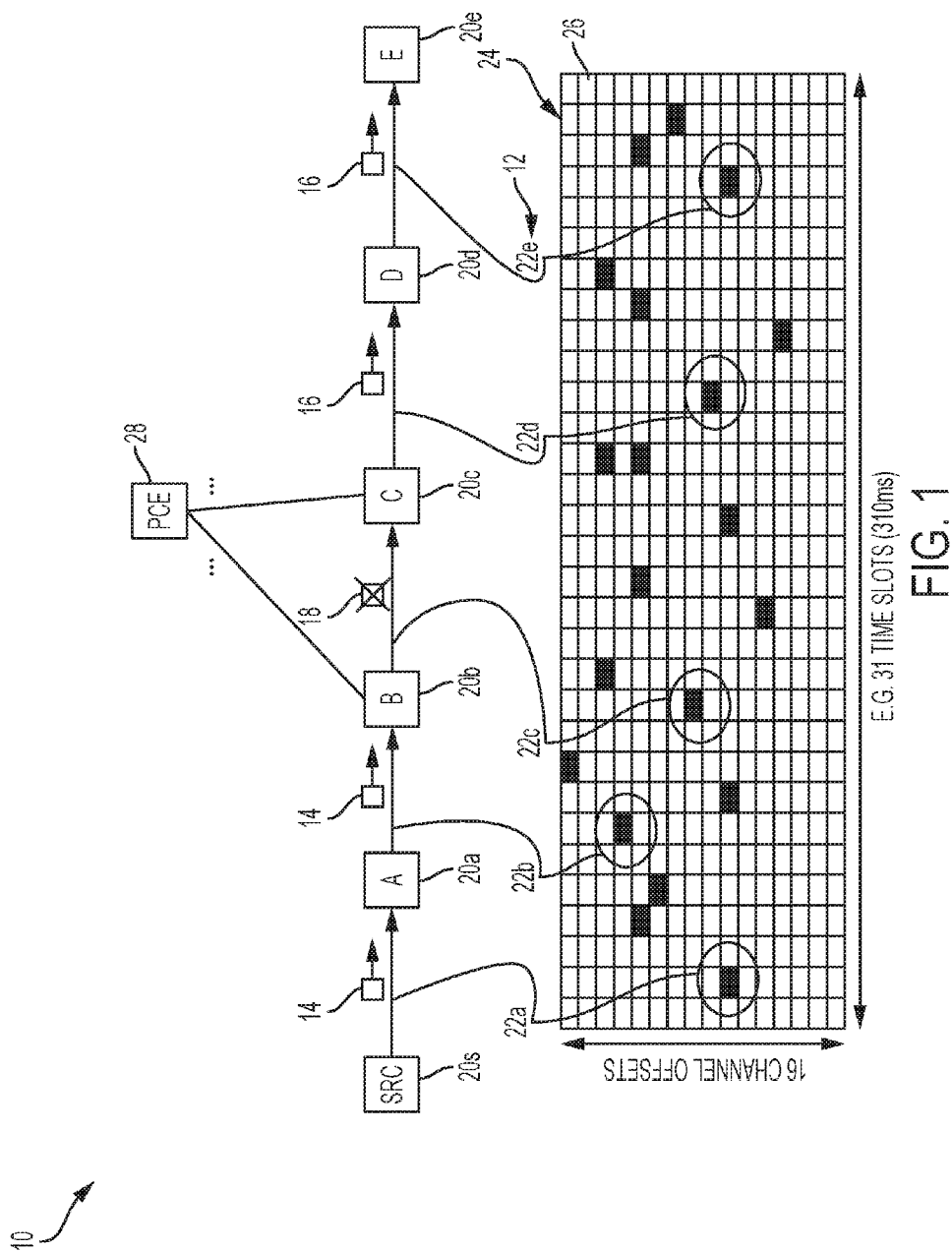
FIG. 1 illustrates an example system having an apparatus for generating and transmitting, in a deterministic transmit slot along a deterministic track allocated for a data packet, a management packet in response to a detected absence of receiving the data packet within a receive slot of the deterministic track, according to an example embodiment.

FIG. 1 illustrates an example deterministic network system (i.e., deterministic network) 10 providing a deterministic track 12 for deterministic forwarding of a data packet 14, and selective insertion of a management packet 16 into the deterministic track 12 in response to a detected packet loss 18, i.e., a detected absence (i.e., failure) 18 of a network device 20 receiving the data packet 14, according to an example embodiment.

Particular embodiments address a concern that can arise in use of a hop-by-hop deterministic track 12 for deterministic forwarding of the data packet 14 originated by a source network device (e.g., "SRC" 20s) and destined for a destination network device "E" 20e in a deterministic network, namely the failure 18 associated with receiving a data packet 14. Conventional implementations of a deterministic track 12 (e.g., Generalized Multi-protocol Label Switching (G-MPLS) according to the 6TiSCH architecture) assume that an allocated cell 22 (comprising a unique wireless channel at a unique timeslot) is reserved exclusively for deterministic forwarding of the data packet 14; however, a loss 18 of the data packet 14 along the deterministic track 12 would conventionally result in unused allocated cells 22 (e.g., 22d, 22e). Even though a network device 20 (e.g., "C" 20c) may respond to the detected failure 18 by requesting a retry to the transmitting network device 20 (e.g., "B" 20b), the allocated cells 22 along the deterministic track 12 that are "downstream" of the packet loss 18 would remain unused, as the retransmitted data packet 14 would be sent during a subsequent instance of the repeating CDU matrix 24 (i.e., repeating deterministic schedule).

According to an example embodiment, a receiving network device 20 (e.g., "C" 20c) can respond to the detected failure 18 of receiving the data packet 14 in an allocated cell 22 (e.g., 22c) by selectively generating a management packet 16, and transmitting the management packet 16 in the allocated cell 22 that was reserved for transmission of the data packet 14 by the receiving network device 20 (e.g., the allocated cell 22d). The management packet 16 can be implemented, for example, as an Operations, Administration, and Maintenance (OAM) frame. Hence, the receiving network device 20 (e.g., "C" 20c) can exploit the detected failure 18 of receiving the data packet 14 in the allocated cell 22c by generating and transmitting the management packet 16 in the allocated cell 22d, in place of the lost data packet 14. Consequently, the remaining allocated cells 22 in the deterministic track 12 (that otherwise would be unused) can still be used for transmitting the management packet 16 toward the destination network device 20 (e.g., "E" 20e). As described with below respect to FIG. 5, the management packet 16 can identify one or more attributes associated with the detected failure 18 (i.e., detected absence) of receiving the data packet 14, enabling the destination network device 20 to collect statistics on receiving the data packets 14 associated with an identifiable flow from the source network device 20 via the deterministic track 12.

Hence, the example embodiments provide an in-band management packet 16 specifying attributes associated with the detected failure 18, enabling the destination network device 20e to obtain information related to the detected failure 18, using the allocated cells 22 to transmit the management packet 16 in place of the lost data packet. The reception of the management packet 16 can enable the destination network device 20e (and/or a central controller such as a PCE 28) to determine whether the deterministic track 12 needs to be "tuned" or "modified", for example using a different path (i.e., sequence of hop-by-hop network devices 20) due to a given network device (e.g., 20b) encountering substantial wireless interference during transmission of the detected failure 18.

As illustrated in FIG. 1, each of the allocated cells 22a, 22b, 22c, 22d, and 22e of the deterministic track 12 are allocated from a CDU matrix 24 having a plurality of cells 26, each cell 26 representing a unique wireless channel at a unique timeslot. Hence, each allocated cell 22 corresponds to a unique cell 26. The CDU matrix 24 can be generated by a central controller such as a path computation element (PCE) 28. The repeatable CDU matrix 24 is illustrated as encompassing sixteen (16) frequency channel offsets over thirty-one (31) 10 millisecond (ms) timeslots identified by timeslot offsets (e.g., an Absolute Slot Number (ASN)) relative to an epochal start of time, such that the CDU matrix 24 has a total duration of 310 ms. In one embodiment, the deterministic track 12 can be generated by the PCE 28; in another embodiment, the deterministic track 12 can be generated in a distributed manner between the network devices 20 (e.g., using RSVP-TE).

The allocated cell 22a is allocated for transmission by the source network device "SRC" 20s to the network device 20a; the allocated cell 22b is allocated for transmission by the network device 20a to the network device 20b; the allocated cell 22c is allocated for transmission by the network device 20b to the network device 20c; the allocated cell 22d is allocated for transmission by the network device 20c to the network device 20d; and the allocated cell 22e is allocated for transmission by the network device 20d to the network device 20e. In one embodiment, an allocated cell 22 also could be implemented as merely a "timeslot" for a fixed wireless channel, hence a given allocated cell 22 also can be referred to herein as a "deterministic transmit slot" (for use by a transmitting network device transmitting a data packet 14), a "deterministic receive slot" (for use by a receiving network device receiving a data packet 14), or more generally the allocated cell 22 can be referred to herein as a "deterministic slot".

Figure 2:
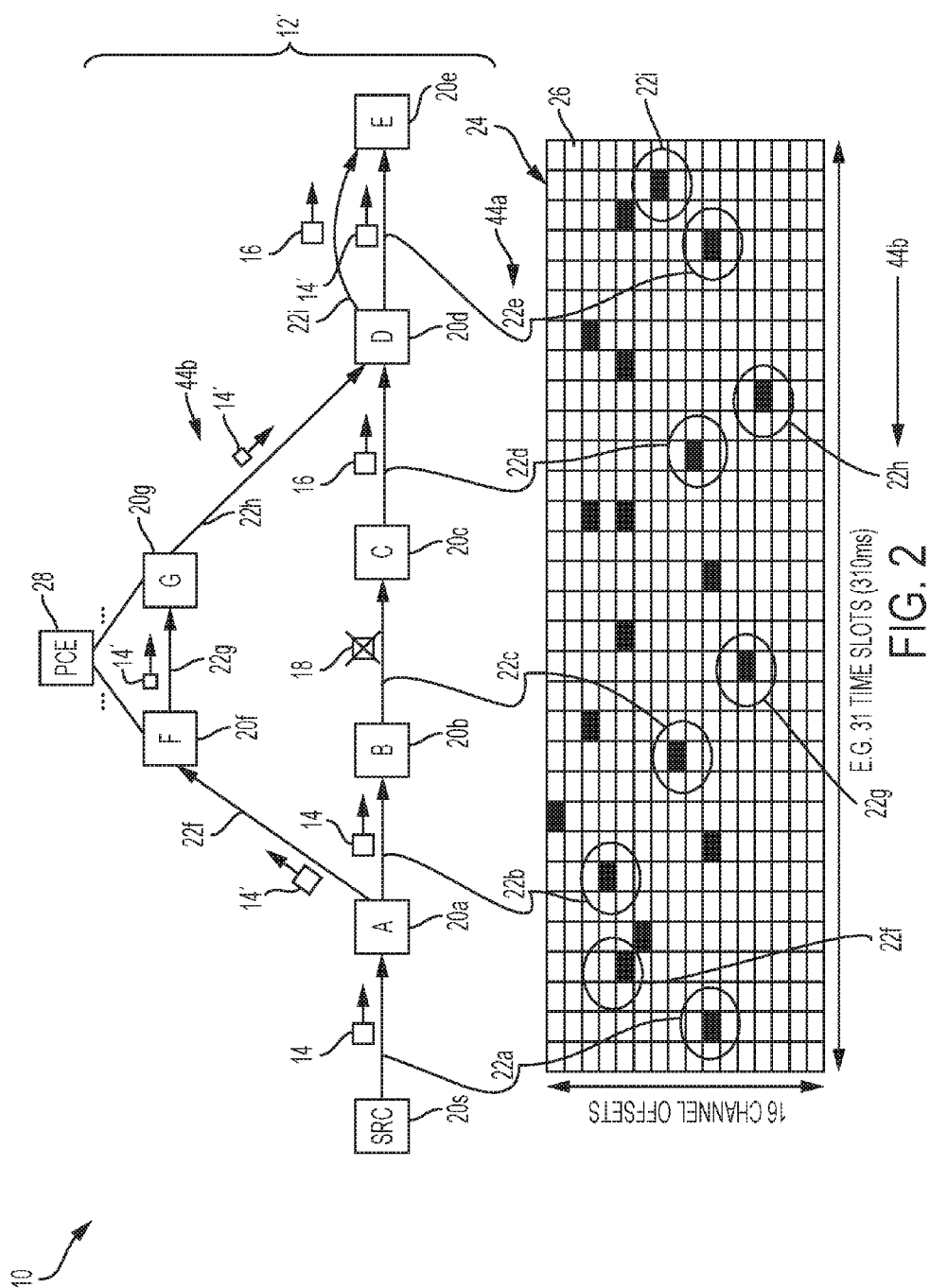
FIG. 2 illustrates another example system having an apparatus for selectively generating and transmitting, in a deterministic transmit slot along a deterministic track allocated for a data packet, a management packet in response to a detected absence of receiving the data packet within any receive slot of the deterministic track allocated for the data packet, according to an example embodiment.

FIG. 2 illustrates a variation in the deterministic network 10, where the deterministic track 12' comprises deterministic segments 44a and 44b that can be allocated for deterministic forwarding of the data packet 14 to the destination network device 20e. As illustrated in FIG. 2, the deterministic segment 44a is the same as the deterministic track 12 in FIG. 1 and comprises the allocated cells 22a, 22b, 22c, 22d, and 22e. A second deterministic segment 44b can be established (e.g., in parallel with the first deterministic segment 44a) as part of a packet replication-and-elimination operation deployment, where the network device 20a is the "replication node" configured for generating a replicated copy 14' of the data packet 14, and the network device 20d is the "elimination node" that eliminates transmission of a duplicate copy of the data packet 14.

The deterministic segment 44b comprises the allocated cells 22f, 22g, and 22h and can be established by the PCE 28 and/or among the different network devices 20. Hence, the network device 20a can generate a replicated data packet 14', and transmit the data packet 14' to the network device 20f using the allocated cell 22f; the network device 20f can forward the replicated data packet 14' to the network device 20g using the allocated cell 22g; and the network device 20g can forward the replicated data packet 14' to the network device 20d using the allocated cell 22h.

Although not illustrated in FIG. 2, the first deterministic segment 44a and the second deterministic segment 44b can be joined by additional interconnecting deterministic links (e.g., link "B-F" interconnecting network devices 20b and 20f; link "C-G" interconnecting network devices 20c and 20g), enabling formation of the deterministic track 12' to resemble a "ladder" structure.

As described below with respect to FIG. 4, the network device 20d can be configured as an "elimination" node that utilizes the redundancy of the multiple deterministic segments 44a and 44b in a deterministic track 12' for reception of at least one of the data packet 14 (via the deterministic segment 44a) or the replicated data packet 14' (via the deterministic segment 44b): if the network device 20d receives both the data packet 14 and the replicated data packet 14', the network device 20*d* can eliminate one of the redundant data packets (e.g., the replicated data packet 14'), and forward the data packet 14 via the allocated cell 22*e*; if the network device 20*d* determines an absence of receiving a data packet 14 (or absence of receiving a replicated data packet 14') from any of the allocated cell 22*d* or 22*h*, the network device 20*d* can generate (if needed) and output the management packet 16 on the allocated cell 22*e* for the deterministic segment 44*a*.

As illustrated in FIG. 2, if the network device 20*d* detects an absence in receiving either the data packet 14 or the replicated copy 14' but still receives at least one of the data packet 14 or the replicated copy 14' (e.g., receives the replicated copy 14'), the network device 20 can forward the received data packet 14' to the next-hop network device 20*e* along the deterministic segment 44*a* using the allocated cell 22*e*, and generate (as needed) and send the management packet 16 via a path (e.g., via the allocated cell 22*i*) distinct from the deterministic track 12'. As described herein the detected absence of receiving a data packet 14 (or 14') includes any one of a detected failure 18 as illustrated in FIG. 1 or 2, or the reception of a management packet 16 in place of the lost data packet 14; as described in further detail below, the management packet 16 can include information identifying the packet type (e.g., in an Ethertype header) that enables any network device 20 to distinguish between a data packet 14 and the management packet 16. Hence, the reception by the network device 20*d* of the management packet 16 in the allocated cell 22*d* from the network device 20*c* constitutes a detected absence of receiving the data packet 14 (as intended during allocation of the allocated cell 22*d*).

Figure 3:
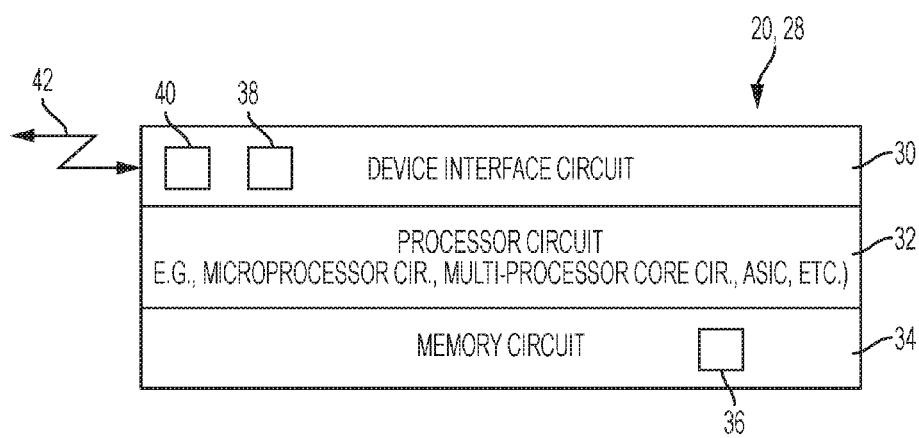
FIG. 3 illustrates an example implementation of any one of the devices of FIG. 1 or 2.

FIG. 3 illustrates an example implementation of any one of the devices 20 and/or 28 of FIG. 1, according to an example embodiment. The apparatus 20 and/or 28 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation.

Each apparatus 20 and/or 28 can include a device interface circuit 30, a processor circuit 32, and a memory circuit 34. The device interface circuit 30 can include a media access control (MAC) circuit 38 and one or more distinct physical layer transceiver (PHY) circuits 40 for communication with any one of the other devices 20 and/or 28; for example, MAC circuit 38 and/or the PHY circuit 40 of the device interface circuit 30 can be implemented as an IEEE based Ethernet transceiver (e.g., IEEE 802.1 TSN, IEEE 802.15.4e, DetNet, etc.) for communications with the devices of FIG. 1 via any type of data link 42, as appropriate (e.g., a wired or wireless link, an optical link, etc.). The processor circuit 32 can be configured for executing any of the operations described herein, and the memory circuit 34 can be configured for storing any data or data packets as described herein, for example in a data structure 36.

Any of the disclosed circuits of the devices 20 and/or 28 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 4:
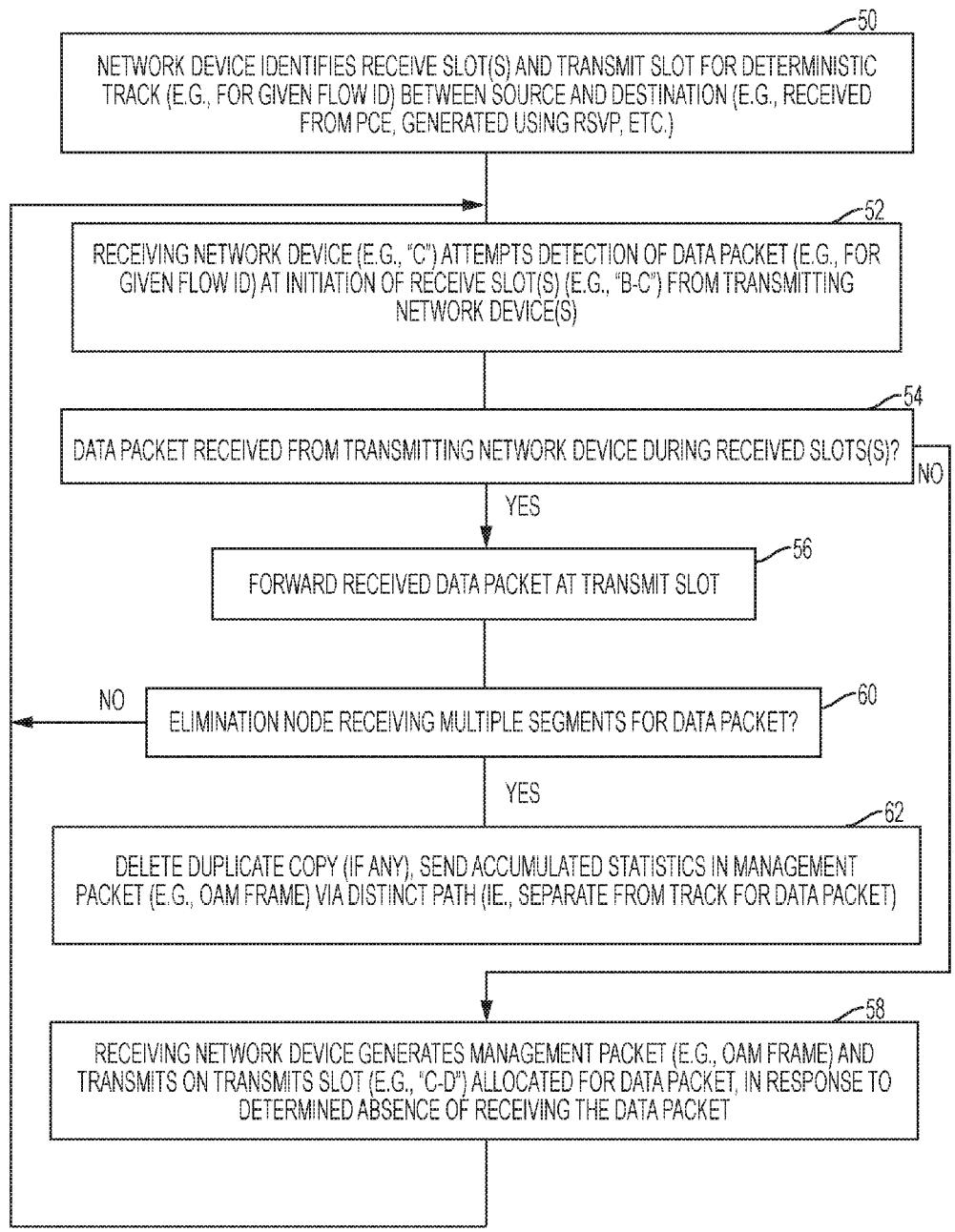
FIG. 4 illustrates an example method of generating and transmitting a management packet, in a deterministic transmit slot along a deterministic track allocated for a data packet, in response to a detected absence of receiving the data packet within a receive slot of the deterministic track, according to an example embodiment.

FIG. 4 illustrates an example method of a network device 20 generating and transmitting a management packet 16, in a deterministic transmit slot along a deterministic track 12 (or 12') allocated for a data packet 14, in response to a detected absence of receiving the data packet 14 within a receive slot of the deterministic track 12 (or 12'), according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the deterministic track 12 (or 12') can be established based on the network devices 20 identifying their associated deterministic transmit slot 22 and/or deterministic receive slot 22 for deterministic forwarding of the data packet 14 through the deterministic network 10. For example, the processor circuit 32 in the source network device "SRC" 20s is configured for identifying in operation 50 allocation of a deterministic transmit slot 22a for deterministic transmission of the data packet 14 toward the destination network device "E" 20e via the next-hop network device 20a, and the processor circuit 32 in the destination network device "E" 20e is configured for identifying in operation 50 allocation of a deterministic receive slot 22e for deterministic reception of the data packet 14 via a deterministic track 12 (or 12'). The processor circuit 32 in each intermediate network device 20 (e.g. 20a, 20b, 20c, 20d, 20f, 20g) is configured for identifying in operation 50, as part of formation of the corresponding deterministic track 12 (or 12'), allocation of a deterministic receive slot 22 (e.g., 22c for network device 20c; 22d for network device 20d) reserved for receiving the data packet 14 from a transmitting network device 20, and a deterministic transmit slot 22 (e.g., 22d for network device 20c; 22e for network device 20e), for transmitting the data packet 14 toward the destination network device 20e along the deterministic track 12 (or 12').

The deterministic track 12 (or 12') can be established in operation 50 between a source network device and a destination network device, for example, based on flow identifier for an identified flow of data packets. The deterministic track 12 (or 12') in operation 50 can be established centrally by a central controller such as the PCE 28, for example based on a network device 20 receiving from the PCE 28 a message specifying the deterministic transmit slot and deterministic receive slot allocated to the network device 20, enabling the network device 20 to deterministically receive and forward the data packet 14. The establishment of the deterministic track 12 (or 12') also can be distributed between the network device 20, for example according to Resource Reservation Protocol (RSVP) according to RFC 2205, Resource Reservation-Traffic Engineering Protocol (RSVP-TE) according to RFC 5151, etc. Hence, the processor circuit 32 in each network device 20 can identify the allocated cells 22, as appropriate, either based on received instructions from the PCE 28 or based on a request-response protocol along a given path between the source network device and destination network device, for example using RSVP-TE.

As illustrated in FIG. 2, the processor circuit 32 of the network device 20d can be configured for identifying in operation 50 allocation of the allocated cell 22h as a receive slot reserved for reception of a replicated copy 14' of the data packet 14, from the network device 20g associated with forwarding the data packet along the second deterministic segment 44b. Hence, the network device 20d, illustrated as an "elimination node", can identify that it can receive the data packet 14 from the network device 20c at the allocated cell 22d, or the replicated copy 14' of the data packet from the network device 20g at the allocated cell 22h.

The forwarding of the data packet 14 along the deterministic track 12 (or 12') can be executed for each instance of the CDU matrix 24, where the network device "SRC" 20s can transmit the data packet 14 to the network device 20a at the allocated cell 22a.

The processor circuit 32 of each receiving network device (e.g., 20a, 20b, 20c, 20d, 20f, and 20g) in operation 52 attempts detection of the data packet 14 (and/or its replicated copy 14') at the initiation of the allocated receive slot from the transmitting network device. For example, the network device 20c can attempt to detect reception of the data packet 14 at the initiation of the deterministic receive slot "B-C" 22c from the transmitting network device 20b; the elimination node 20d in FIG. 2 can attempt in operation 52 to detect the data packet 14 within the receive slot 22d, and the replicated copy 14' within the receive slot 22h.

If in operation 54 the network device (e.g., 20a) receives the data packet 14 from its transmitting network device (e.g., 20s) during the allocated receive slot (e.g., 22a), the processor circuit 32 in operation 56 can forward the received data packet 14 to its next-hop successor network device (e.g., 20b) at the allocated transmit slot (e.g., 22b). As illustrated in FIG. 2, the network device 20a, as a replication node, can output the replicated copy 14' along the second deterministic segment 44b at the allocated transmit slot 22f. As illustrated in FIGS. 1 and 2, the network devices 20b, 20f, and 20g each are configured for outputting the data packet 14 (or replicated copy 14') at the associated transmit slots 22c, 22g, and 22h, respectively.

The processor circuit 32 of each network device 20 is configured in operation 54 for detecting an absence 18 of receiving the data packet 14 at the allocated receive slot; as illustrated in FIG. 1, the processor circuit 32 of the network device 20c can detect the absence 18 of receiving the data packet 14 from the network device 20b at the allocated receive slot 20c, for example due to wireless interference, etc.

In response to detecting the absence 18 of receiving the data packet 14 in operation 54, the processor circuit 32 of the network device 20c in operation 58 is configured for generating a management packet 16 (e.g., an OAM frame) and transmitting the management packet 16 along the deterministic track 12 (or 12') on the transmit slot "C-D" 22d having been allocated for transmission of the data packet 14 from the network device 20c to the network device 20d. As described below with respect to FIG. 5, the management packet 16 can identify one or more attributes associated with the absence 18 of receiving the data packet 14.

The processor circuit 32 of the network device 20d in FIG. 1, in response to receiving the management packet 16 during the receive slot 22d, detects in operation 54 the absence of receiving the data packet 14, and forwards the management packet 16 (optionally after updating with additional accumulated statistics) along the deterministic track 12' to the network device 20e on the transmit slot "D-E" 22e. Hence, the network device 20e can respond to the management packet 16, as appropriate, for example logging the management packet 16, sending a message to a management entity such as the PCE 28, etc.

FIG. 2 illustrates the network device 20d as an elimination node, where the processor circuit 32 of the network device 20d can detect the absence of receiving the data packet 14 (based on the received management packet 16 during the receive slot 22d) and reception of the replicated copy 14' during the receive slot 22$h$. In response to receiving the replicated copy 14' of the data packet 14 in the allocated cell 22$h$, the processor circuit 32 in operation 56 can forward the replicated copy 14' along the deterministic segment 44$a$ to the network device 20$e$ in the transmit slot 22$e$. Since in operation 60 the network device 20$d$ is an elimination node receiving the multiple segments 44$a$, 44$b$ for the data packet 14, normally the network device 20$d$ in operation 62 would delete any duplicate copy of the data packet 14 (assuming there was no detected failure 18 and both the data packet 14 and the replicated copy 14' was received by the network device 20$d$); however since FIG. 2 illustrates that the network device 20$d$ received the management packet 16 during the allocated cell 22$d$ and the replicated copy 14' during the allocated cell 22$h$, the processor circuit 32 of the network device 20$d$ in operation 62 is configured for forwarding the management packet 16 (after optionally adding any accumulated statistics) to the network device 20$e$ via a distinct path, illustrated in FIG. 2 by the allocated cell 22$i$ that is distinct from either the deterministic segment 44$a$ or the deterministic segment 44$b$.

Figure 5:
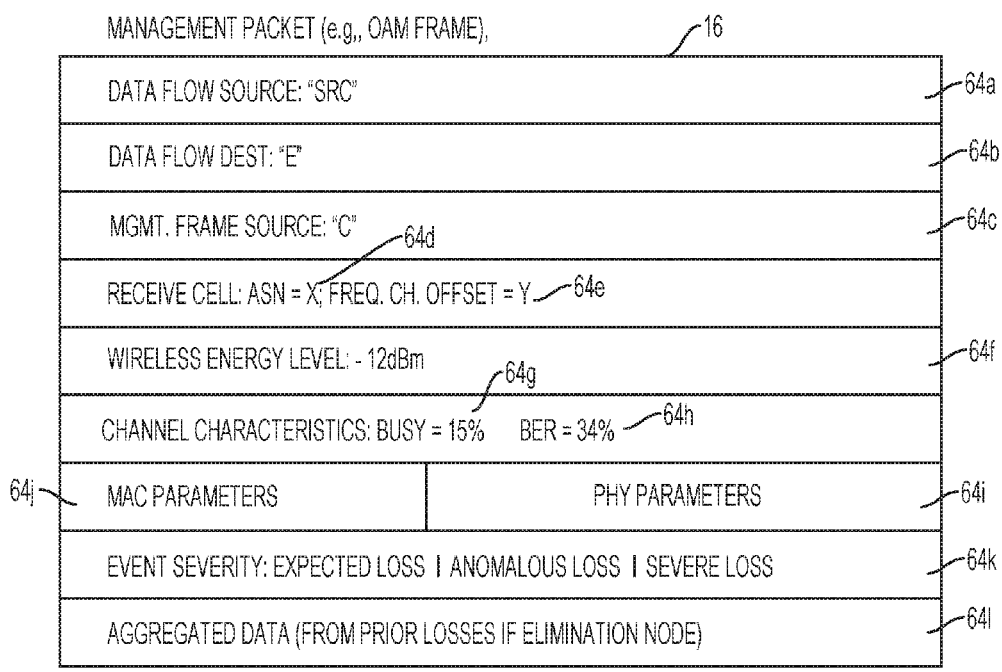
FIG. 5 illustrates an example management packet, according to an example embodiment.

FIG. 5 illustrates an example management packet 16, according to an example embodiment. Although not shown in FIG. 5, the management packet 16 can include a packet header that identifies the type of data packet as "management"; for example, an Ethertype field in the packet header can be used to identify the packet type as "management", enabling any network device 20 to distinguish the management packet 16 from a data packet 14.

FIG. 5 illustrates that the management packet 16 identifies one or more attributes 64 associated with the absence 18 of receiving the data packet 14. Example attributes 64 can include: an identifier 64$a$ for the data flow source 20$s$; an identifier 64$b$ for the data flow destination 20$e$; an identifier 64$c$ for the management frame source that generated the management packet 16 (e.g., network device "C" 20$c$); an identifier "X" 64$d$ identifying the transmission time of the receive slot (e.g., 22$c$) relative to the prescribed time domain of the deterministic network (e.g., ASN number), and an identifier 64$e$ identifying a frequency channel "Y" allocated for the transmission of the data packet at the receive slot (e.g., 22$c$).

Additional attributes 64 can be added to the management packet 16 specifying detected conditions that can be relevant in identifying the cause of the detected failure 18, for example an identifier 64$f$ identifying a detected (ambient) wireless energy level detected by the first network device during the receive slot (e.g., 22$c$), identifiers 64$g$ and 64$h$ identifying detected wireless channel characteristics associated with the frequency channel "Y" in use for the receive slot (e.g., 22$c$), for example the identifier 64$g$ identifying the percentage that the frequency channel was found "busy" (e.g., due to co-channel interference), or the identifier 64$h$ identifying a bit error rate (BER).

Additional attributes 64 can be obtained from the device interface circuit 30, for example an identifier 64$i$ identifying one or more physical layer (PHY) transceiver parameters (e.g., detected receive signal strength indicator (RSSI), etc.), or an identifier 64$j$ identifying one or more media access (MAC) parameters. The management packet 16 also can specify an event severity identifier 64$k$ describing the absence 18 as at least one of a statistically expected loss, an anomalous loss, or a severe loss. The management packet 16 also can specify additional aggregated data 64$l$ for multiple absences of receiving the data packet 14 relative to multiple instances of the receive slot (22$c$) in the repeating deterministic schedule of the CDU matrix 24 in the deterministic network 10.

According to example embodiments, a management packet 16 can be inserted into a deterministic track 12 (or 12') in response to a detected absence (i.e., failure) 18 of receiving a data packet 14 along the deterministic track 12 (or 12'), enabling a network device to use the transmit slot (having been allocated for the data packet 14) for transmission of the management packet 16 along the deterministic track 12 (or 12') to the destination device, in place of the lost data packet. The example embodiments enable early and precise detection of packet loss at a specific link (e.g., "B-C") and a specific allocated cell (e.g., 22$c$) along the deterministic track (or along a deterministic segment of the deterministic track), and the management packets can specify information that enables the destination network device to evaluate precisely the packet loss(es) at the specific link and allocated cell, enabling the destination network device to execute early problem determination for potential corrective action initiated by the destination network device (e.g., report to a network management entity, request a new or changed deterministic track that avoids the specified link or uses another cell encountering less interference, etc.).

Although the example embodiments illustrated allocated cells with different frequency offsets at different timeslots, the example embodiments can be implemented using a time division-multiplexed system using a single frequency. Further, any one of the intermediate network devices 20 also can be implemented as a switching device providing the necessary timing and/or synchronization intervals to receive and/or transmit data packets as described with respect to the transmit or receive slots.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
a first network device in a deterministic network identifying first and second slots for transmission of a data packet toward a destination device along a deterministic track of the deterministic network, the first slot reserved for the first network device receiving the data packet from a second network device and the second slot reserved for transmission by the first network device of the data packet toward the destination device along the deterministic track;
the first network device detecting, in the first slot, an absence of receiving the data packet from the second network device; and
the first network device selectively generating and transmitting in the second slot, in response to the absence of receiving the data packet, a management packet along the deterministic track.

2. The method of claim 1, the management packet identifying one or more attributes associated with the absence of receiving the data packet.

3. The method of claim 2, wherein the management packet specifies any one of a transmission time of the first slot relative to a prescribed time domain of the deterministic network (ASN), a frequency channel allocated for the transmission of the data packet at the first slot, a detected (ambient) wireless energy level detected by the first network device during the first slot, a detected wireless channel characteristic associated with the frequency channel, one or more physical layer (PHY) transceiver parameters, or one or more media access (MAC) parameters.

4. The method of claim 2, wherein the attributes include an event severity describing the absence of receiving the data packet during the first slot.

5. The method 4, wherein the event severity specifies at least one of a statistically expected loss, an anomalous loss, or a severe loss.

6. The method of claim 1, wherein the deterministic track comprises a first deterministic segment and a second deterministic segment, the absence of receiving the data packet detected on the first deterministic segment, the method further comprising:
 the first network device identifying a third slot reserved for reception of a replicated copy of the data packet, by the first network device, from a third network device associated with forwarding the data packet along the second deterministic segment;
 the first network device forwarding the replicated copy of the data packet, in the second slot along the deterministic track toward the destination, in response to receiving the replicated copy of the data packet in the third slot;
 the first network device sending the management packet via a path distinct from the deterministic track.

7. The method of claim 6, wherein the management packet includes aggregated data for multiple absences of receiving the data packet relative to multiple instances of the first slot in a repeating deterministic schedule for the deterministic network.

8. The method of claim 1, wherein the deterministic track is a 6TiSCH track, the first slot based on a first 6TiSCH cell specifying a first channel offset and a corresponding first timeslot offset, and the second slot based on a second 6TiSCH cell specifying a second channel offset and a corresponding second timeslot offset.

9. The method of claim 1, wherein the identifying includes receiving a message, identifying the first and second slots for transmission of the data packet, from a management entity.

10. An apparatus comprising:
 a device interface circuit; and
 a processor circuit configured for identifying first and second slots for transmission of a data packet toward a destination device along a deterministic track of a deterministic network, the first slot reserved for the apparatus, operating as a first network device, receiving the data packet from a second network device and the second slot reserved for transmission by the apparatus of the data packet toward the destination device along the deterministic track;
 the processor circuit further configured for detecting, in the first slot, an absence of receiving the data packet from the second network device, and in response to the detected absence selectively generating a management packet and causing transmission, by the device interface circuit, of the management packet along the deterministic track in the second slot.

11. The apparatus of claim 10, wherein the management packet identifies one or more attributes associated with the absence of receiving the data packet.

12. The apparatus of claim 11, wherein the management packet specifies any one of a transmission time of the first slot relative to a prescribed time domain of the deterministic network (ASN), a frequency channel allocated for the transmission of the data packet at the first slot, a detected (ambient) wireless energy level detected by the first network device during the first slot, a detected wireless channel characteristic associated with the frequency channel, one or more physical layer (PHY) transceiver parameters, or one or more media access (MAC) parameters.

13. The apparatus of claim 11, wherein the attributes include an event severity describing the absence of receiving the data packet during the first slot.

14. The apparatus 13, wherein the event severity specifies at least one of a statistically expected loss, an anomalous loss, or a severe loss.

15. The apparatus of claim 10, wherein the deterministic track comprises a first deterministic segment and a second deterministic segment, the absence of receiving the data packet detected on the first deterministic segment, the processor circuit further configured for:
 identifying a third slot reserved for reception of a replicated copy of the data packet, by the first network device, from a third network device associated with forwarding the data packet along the second deterministic segment;
 the processor circuit configured for causing forwarding the replicated copy of the data packet, in the second slot along the deterministic track toward the destination, in response to detecting reception of the replicated copy of the data packet in the third slot;
 the processor circuit configured for causing the device interface circuit to send the management packet via a path distinct from the deterministic track.

16. The apparatus of claim 15, wherein the management packet includes aggregated data for multiple absences of receiving the data packet relative to multiple instances of the first slot in a repeating deterministic schedule for the deterministic network.

17. The apparatus of claim 10, wherein the deterministic track is a 6TiSCH track, the first slot based on a first 6TiSCH cell specifying a first channel offset and a corresponding first timeslot offset, and the second slot based on a second 6TiSCH cell specifying a second channel offset and a corresponding second timeslot offset.

18. The apparatus of claim 10, wherein the processor circuit is configured for identify the first and second slots based on receiving a message, identifying the first and second slots for transmission of the data packet, from a management entity.

19. One or more non-transitory tangible media encoded with logic for execution by a machine and when executed by the machine operable for:
 the machine, operating as a first network device, identifying first and second slots for transmission of a data packet toward a destination device along a deterministic track of a deterministic network, the first slot reserved for the first network device receiving the data packet from a second network device and the second slot reserved for transmission by the first network device of the data packet toward the destination device along the deterministic track;
 the first network device detecting, in the first slot, an absence of receiving the data packet from the second network device; and
 the first network device selectively generating and transmitting in the second slot, in response to the absence of receiving the data packet, a management packet along the deterministic track.

20. The one or more non-transitory tangible media of claim 19, wherein the management packet identifies one or more attributes associated with the absence of receiving the data packet, wherein the attributes include an event severity describing the absence of receiving the data packet during the first slot.

* * * * *